(12) United States Patent
Wu (10) Patent No.: US 8,355,463 B2
(45) Date of Patent: Jan. 15, 2013

(54) RADIO TRANSMISSION DEVICE AND MODULATION METHOD

(75) Inventor: Jianming Wu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 34 days.

(21) Appl. No.: 13/045,121

(22) Filed: Mar. 10, 2011

(65) Prior Publication Data

US 2011/0158349 A1 Jun. 30, 2011

Related U.S. Application Data

(63) Continuation of application No. PCT/JP2008/067740, filed on Sep. 30, 2008.

(51) Int. Cl.
*H04L 27/36* (2006.01)

(52) U.S. Cl. ......... 375/298; 375/261; 375/295; 375/308

(58) Field of Classification Search ............... 375/298, 375/295, 308, 261

See application file for complete search history.

(56) References Cited

U.S. PATENT DOCUMENTS

| | | | | |
|---|---|---|---|---|
| 6,442,217 | B1 * | 8/2002 | Cochran | 375/326 |
| 7,154,961 | B2 | 12/2006 | Wengerter et al. | |
| 7,752,430 | B2 * | 7/2010 | Dzung | 713/151 |

FOREIGN PATENT DOCUMENTS

| | | |
|---|---|---|
| JP | 2000-059450 | 2/2000 |
| JP | 2005-236750 | 9/2005 |
| WO | 2004/036818 | 4/2004 |

OTHER PUBLICATIONS

International Search Report issued for corresponding International Patent Application No. PCT/JP2008/067740, dated Nov. 4, 2008.
M. Morimoto et al; "A Hierarchical Image Transmission System in a Fading Channel"; in Proc. IEEE Int. Conf. Universal Personal Commun. (ICUPC' 95) pp. 769-772; Dated Oct. 1995.
S. Pietrzyk et al; "Subcarrier and Power Allocation for QoS-aware OFDMA Systems Using Embedded Modulation"; in Proc. Int. Conf. Commun. (ICC) vol. 6, pp. 3202-3206; IEEE 2004.
P. Vitthaladevuni et al.; "A Recursive Algorithm for the Exact BER Computation of Generalized Hierarchical QAM Constellations"; IEEE Trans. On Information Theory, vol. 49, No. 1, pp. 297-307; Dated Jan. 2003.
3GPP TR 25.814; V7.0.0; 3rd Generation Partnership Project; Technical Specification Group Radio Access Network; Physical layer aspects for evolved Universal Terrestrial Radio Access (UTRA); (Release 7); Dated Jun. 2006.

(Continued)

*Primary Examiner* — Ted Wang
(74) *Attorney, Agent, or Firm* — Myers Wolin, LLC (57) ABSTRACT

A radio transmission device includes a modulation unit that maps a transmission bit sequence to a symbol corresponding to any one signal point by using a constellation in which a plurality of congruent equilateral triangles having a signal point as an apex are formed in each of four quadrants of an IQ plane representing an in-phase component and a quadrature component of a signal, two arbitrary neighboring equilateral triangles share one side, and signal points closest to an original point in the four quadrants form two neighboring equilateral triangles that share one side. The radio transmission device also includes a transmission unit that transmits the symbol obtained by mapping performed by the modulation unit.

9 Claims, 8 Drawing Sheets

OTHER PUBLICATIONS

K. Ramchandran et al; "Multiresolution Broadcast for Digital HDTV Using Joint Source/Channel Coding"; IEEE Journal On Selected Areas in Communications, vol. 11, No. 1, pp. 6-22; Dated Jan. 1993.

M. B. Pursley et al; "Adaptive Nonuniform Phase-Shift-Key Modulation for Multimedia Traffic in Wireless Networks"; IEEE Journal On Selected Areas in Communications vol. 18, No. 8, pp. 1394-1407; Dated Aug. 2000.

D. I. Kim; "Two-Best User Scheduling for High-Speed Downlink Multicode CDMA with Code Constraint"; IEEE Communications Society Globecom 2004, pp. 2659-2663; Nov. 29-Dec. 3, 2004.

M. J. Hossain; "Rate Adaptive Hierarchical Modulation-Assisted Two-User Opportunistic Scheduling"; IEEE Transactions On Wireless Communications, Vol. 6, No. 6, pp. 2076-2085; Jun. 2007.

D. Raphaeli et al; "Constellation Shaping for Pragmatic Turbo-Coded Modulation With High Spectral Efficiency"; IEEE Transactions On Communications, vol. 52, No. 3, pp. 341-345; Mar. 2004.

F. R. Kschischang; "Optimal Nonuniform Signaling for Gaussian Channels"; IEEE Transactions on Information Theory, vol. 39, No. 3, pp. 913-929; May 1993.

N. H. Ngo et al.; "Performance of non-uniform 16QAM modulation over linear and nonlinear channels"; Electronics Letters. vol. 42, No. 9; Apr. 27, 2006.

Lee-Fang Wei; "Coded Modulation with Unequal Error Protection"; IEEE Transactions On Communications, vol. 41, No. 10, pp. 1439-1449; Oct. 1993.

A. R. Calderbank et al.; "Multilevel Codes for Unequal Error Protection"; IEEE Transactions On Information Theory, vol. 39, No. 4, pp. 1234-1248; Jul. 1993.

* cited by examiner

|  | TYPICAL 16QAM | | MODIFIED 16QAM | |
|---|---|---|---|---|
|  | I COMPONENT | Q COMPONENT | I COMPONENT | Q COMPONENT |
| $A_0$ | 0.316228 | 0.316228 | 0.41459 | 0.41459 |
| $A_1$ | 0.948683 | 0.316228 | 1.025495 | 0.250898 |
| $A_2$ | 0.316228 | 0.948683 | 0.250898 | 1.025495 |
| $A_3$ | 0.948683 | 0.948683 | 0.861803 | 0.861803 |
| $B_0$ | -0.94868 | 0.316228 | -0.85027 | 0.403055 |
| $B_1$ | -0.31623 | 0.316228 | -0.23936 | 0.239364 |
| $B_2$ | -0.94868 | 0.948683 | -1.01396 | 1.01396 |
| $B_3$ | -0.31623 | 0.948683 | -0.40306 | 0.850269 |

|  | TYPICAL 64QAM | | MODIFIED 64QAM | |
|---|---|---|---|---|
|  | I COMPONENT | Q COMPONENT | I COMPONENT | Q COMPONENT |
| $A_0$ | 0.154303 | 0.154303 | 0.209775 | 0.209775 |
| $A_1$ | 0.46291 | 0.154303 | 0.507866 | 0.129901 |
| $A_2$ | 0.771517 | 0.154303 | 0.805957 | 0.050028 |
| $A_3$ | 1.080123 | 0.154303 | 1.104048 | -0.02985 |
| $A_4$ | 0.154303 | 0.46291 | 0.129901 | 0.507866 |
| $A_5$ | 0.46291 | 0.46291 | 0.427993 | 0.427993 |
| $A_6$ | 0.771517 | 0.46291 | 0.726084 | 0.348119 |
| $A_7$ | 1.080123 | 0.46291 | 1.024175 | 0.268246 |
| $A_8$ | 0.154303 | 0.771517 | 0.050028 | 0.805957 |
| $A_9$ | 0.46291 | 0.771517 | 0.348119 | 0.726084 |
| $A_{10}$ | 0.771517 | 0.771517 | 0.64621 | 0.64621 |
| $A_{11}$ | 1.080123 | 0.771517 | 0.944302 | 0.566337 |
| $A_{12}$ | 0.154303 | 1.080123 | -0.02985 | 1.104048 |
| $A_{13}$ | 0.46291 | 1.080123 | 0.268246 | 1.024175 |
| $A_{14}$ | 0.771517 | 1.080123 | 0.566337 | 0.944302 |
| $A_{15}$ | 1.080123 | 1.080123 | 0.864428 | 0.864428 |
| $B_0$ | -1.08012 | 0.154303 | -1.01539 | 0.360733 |
| $B_1$ | -0.77152 | 0.154303 | -0.7173 | 0.28086 |
| $B_2$ | -0.46291 | 0.154303 | -0.41921 | 0.200987 |
| $B_3$ | -0.1543 | 0.154303 | -0.12111 | 0.121113 |
| $B_4$ | -1.08012 | 0.46291 | -1.09526 | 0.658824 |
| $B_5$ | -0.77152 | 0.46291 | -0.79717 | 0.578951 |
| $B_6$ | -0.46291 | 0.46291 | -0.49908 | 0.499078 |
| $B_7$ | -0.1543 | 0.46291 | -0.20099 | 0.419205 |
| $B_8$ | -1.08012 | 0.771517 | -1.17513 | 0.956916 |
| $B_9$ | -0.77152 | 0.771517 | -0.87704 | 0.877042 |
| $B_{10}$ | -0.46291 | 0.771517 | -0.57895 | 0.797169 |
| $B_{11}$ | -0.1543 | 0.771517 | -0.28086 | 0.717296 |
| $B_{12}$ | -1.08012 | 1.080123 | -1.25501 | 1.255007 |
| $B_{13}$ | -0.77152 | 1.080123 | -0.95692 | 1.175134 |
| $B_{14}$ | -0.46291 | 1.080123 | -0.65882 | 1.09526 |
| $B_{15}$ | -0.1543 | 1.080123 | -0.36073 | 1.015387 |

RADIO TRANSMISSION DEVICE AND MODULATION METHOD

CROSS-REFERENCE TO RELATED APPLICATION

This application is a continuation of International Application No. PCT/JP2008/067740, filed on Sep. 30, 2008, the entire contents of which are incorporated herein by reference.

FIELD

The embodiments discussed herein are directed to a radio transmission device and a modulation method.

BACKGROUND

Generally, a radio transmission device modulates and transmits information bit to be transmitted. Examples of a modulation scheme used for modulation of information bit include a binary phase shift keying (BPSK), a quadrature phase shift keying (QPSK), a 16 quadrature amplitude modulation (QAM), and a 64QAM. A modulation multi-value number refers to the number of bits to be transmitted per symbol. For example, in the BPSK scheme, one bit can be transmitted per symbol, and in the QPSK scheme, two bits are transmitted per symbol. Further, in the 16QAM scheme, four bits can be transmitted per symbol, and in the 64QAM scheme, six bits can be transmitted per symbol.

Figure 1:
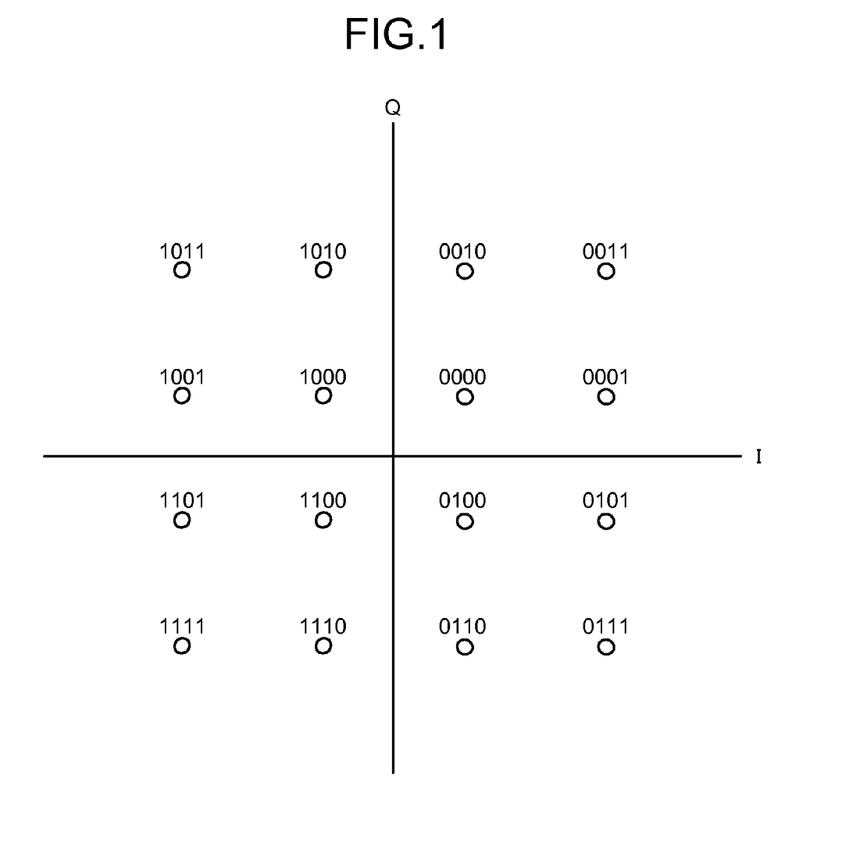
FIG. 1 is a diagram illustrating an example of a 16QAM constellation.

In modulation performed by the modulation schemes, mapping according to a constellation representing signal points obtained by plotting an in-phase component (hereinafter, "I component") and a quadrature component (hereinafter, referred to as "Q component") of a signal on an in-phase quadrature (IQ) plane is performed. That is, when information bit is modulated by each modulation scheme, bits corresponding to a modulation multi-value number are mapped to a symbol corresponding to any one signal point on the constellation. Specifically, a 16QAM constellation is formed, for example, as illustrated in FIG. 1. In the 16QAM constellation, 16 signal points are arranged, and each signal point corresponds to one symbol that corresponds to a combination of four bits. For example, when four bits "0000" are modulated by the 16QAM scheme, a symbol corresponding to signal point closest to an original point among four signal points present on a first quadrant (a quadrant in which both of the I component and the Q component are positive) is generated.

The constellation becomes different according to a modulation scheme. As the modulation multi-value number increases, the number of signal points to be arranged increases, and thus the distance between signal points decreases. If a phase or an amplitude of a symbol changes due to influence of noise or fading at the time of transmission, the position of a signal point corresponding to a symbol changes. As the modulation multi-value number of the modulation scheme increases, demodulation errors occur more easily. Thus, in a state in which a propagation environment is good, if the modulation multi-value number increases, since the number of bits to be transmitted per symbol increases, transmission efficiency is improved. However, in a state in which a propagation environment is bad, if the modulation multi-value number increases, since demodulation is not correctly performed, retransmission is frequently performed, thereby deteriorating transmission efficiency. For this reason, a study on modulating data by a modulation scheme in which a constellation at the time of first transmission is different from a constellation at the time of retransmission, and thus improving the whole throughput has been conducted.

Meanwhile, hierarchical modulation of hierarchizing and modulating a plurality of bits per symbol has recently attracted attention. For example, in the hierarchical modulation, four bits are hierarchized into upper-order two bits and lower-order two bits and symbol-mapped so that an error can become difficult to occur in the upper-order two bits compared to the lower-order two bits. For example, in the constellation illustrated in FIG. 1, upper-order two bits including a first bit and a second bit mapped to each signal point are all "00" on four signal points on the first quadrant and all "10" on four signal points on a second quadrant (a quadrant in which the I component is negative and the Q component is positive). Similarly, upper-order two bits are all "11" on four signal points on a third quadrant (a quadrant in which both the I component and the Q component are negative) and all "01" on four signal points on a fourth quadrant (a quadrant in which the I component is positive and the Q component is negative).

Thus, even if the position of the signal point on the constellation changes due to influence of noise or fading, the upper-order two bits can correctly be demodulated unless an I axis or a Q axis is straddled due to that change. That is, in the 16 QAM constellation illustrated in FIG. 1, since the average distance on the upper-order two bits is large, the upper-order two bits of the four bits mapped to each signal point become relatively difficult to cause an error.

However, third bits in FIG. 1 are all "0" on signal points of two rows close to the I axis among signal points of four rows arranged in a direction of the I axis and are all "1" on signal points of two rows far from the I axis. Similarly, four bits in FIG. 1 are all "0" on signal points of two rows close to the Q axis among signal points of four rows arranged in a direction of the Q axis and are all "1" on signal points of two rows far from the Q axis. Thus, if the position of the signal point on the constellation changes due to influence of fading, even when a change corresponding to half of the distance between signal points occurs, a demodulation error occurs in the lower-order two bits. That is, in the 16QAM constellation illustrated in FIG. 1, since the average distance between the signal points on the lower-order two bits is small, an error occurs relatively easily in the lower-order two bits among the four bits mapped to each signal point.

However, in the conventional modulation scheme using the constellation, there is a problem in that an error resilience is not greatly different between the upper-order bits and the lower-order bits, and a sufficient degree of accuracy of demodulation is not obtained. That is, in the constellation in FIG. 1, since a signal point corresponding to four bits "0011" is far from the I axis and the Q axis, even if a phase or an amplitude greatly changes, a demodulation error does not occur in the upper-order two bits. However, since a signal point corresponding to four bits "0000" is close to the I axis and the Q axis, the position of the signal point is more likely to change while straddling the I axis or the Q axis due to a change in phase or amplitude, and thus there is little difference of an error resilience between the upper-order two bits and the lower-order two bits. That is, the upper-order bits are almost the same in error rate as the lower-order bits, and a degree of accuracy of demodulation of a symbol is not sufficiently improved.

Further, in order to sufficiently differentiate the upper-order bits from the lower-order bits, instead of arranging the signal points at a regular interval, the signal points inside each quadrant may be arranged away from the original point of the IQ plane. However, if the signal points are away from the original point in general, a maximum amplitude of a symbol increases, and thus maximum transmission power increases.

Further, if the position of a signal point farthest from the original point in each quadrant is fixed and the other signal points are arranged away from the original point, although maximum transmission power does not change, average transmission power increases, and a degree of accuracy of demodulation on the lower-order bits deteriorates.

Patent Document: Japanese National Publication of International Patent Application No. 2005-533461

SUMMARY

According to an aspect of an embodiment of the invention, a radio transmission device includes a modulation unit that maps a transmission bit sequence to a symbol corresponding to any one signal point by using a constellation in which a plurality of congruent equilateral triangles having a signal point as an apex are formed in each of four quadrants of an IQ plane representing an in-phase component and a quadrature component of a signal, two arbitrary neighboring equilateral triangles share one side, and signal points closest to an original point in the four quadrants form two neighboring equilateral triangles that share one side; and a transmission unit that transmits the symbol obtained by mapping performed by the modulation unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings.

[a] First Embodiment

Figure 2:
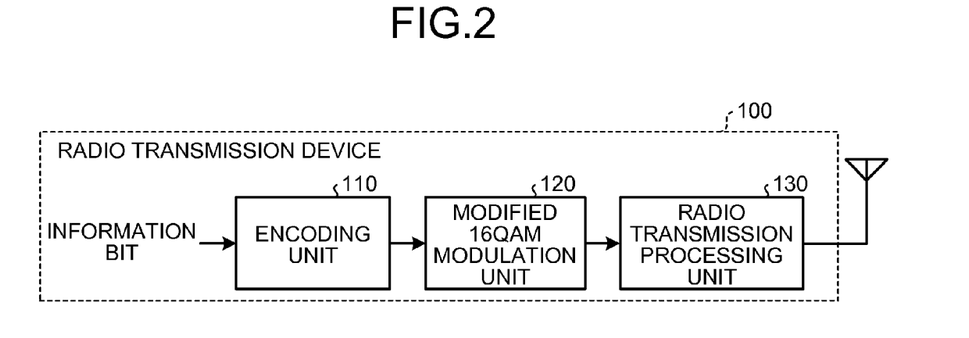
FIG. 2 is a block diagram illustrating a major configuration of a radio transmission device according to a first embodiment.

FIG. 2 is a block diagram illustrating a major configuration of a radio transmission device 100 according to a first embodiment of the present invention. The radio transmission device 100 illustrated in the same drawing includes an encoding unit 110, a modified 16QAM modulation unit 120, and a radio transmission processing unit 130.

The encoding unit 110 performs error correction coding on an information bit that is a transmission target and outputs a bit sequence in which a redundant bit is added to an information bit to the modified 16QAM modulation unit 120.

The modified 16QAM modulation unit 120 maps and modulates the bit sequence output from the encoding unit 110 by four bits. At this time, the modified 16QAM modulation unit 120 modulates the bit sequence, for example, through a modified 16QAM having a constellation illustrated in FIG. 3. That is, the modified 16QAM modulation unit 120 modulates the bit sequence through a constellation in which apexes of two equilateral triangles in which a line segment inclined at an angle of 45° relative to an I axis and a Q axis is shared as a base and a middle point of the base is identical to an original point of an IQ plane are used as signal points closest to the original point in four quadrants, and in each of the quadrants, an apex of an equilateral triangle having the signal point closest to the original point as one apex and an apex of an equilateral triangle that shares one side with the equilateral triangle are used as signal points.

Figure 3:
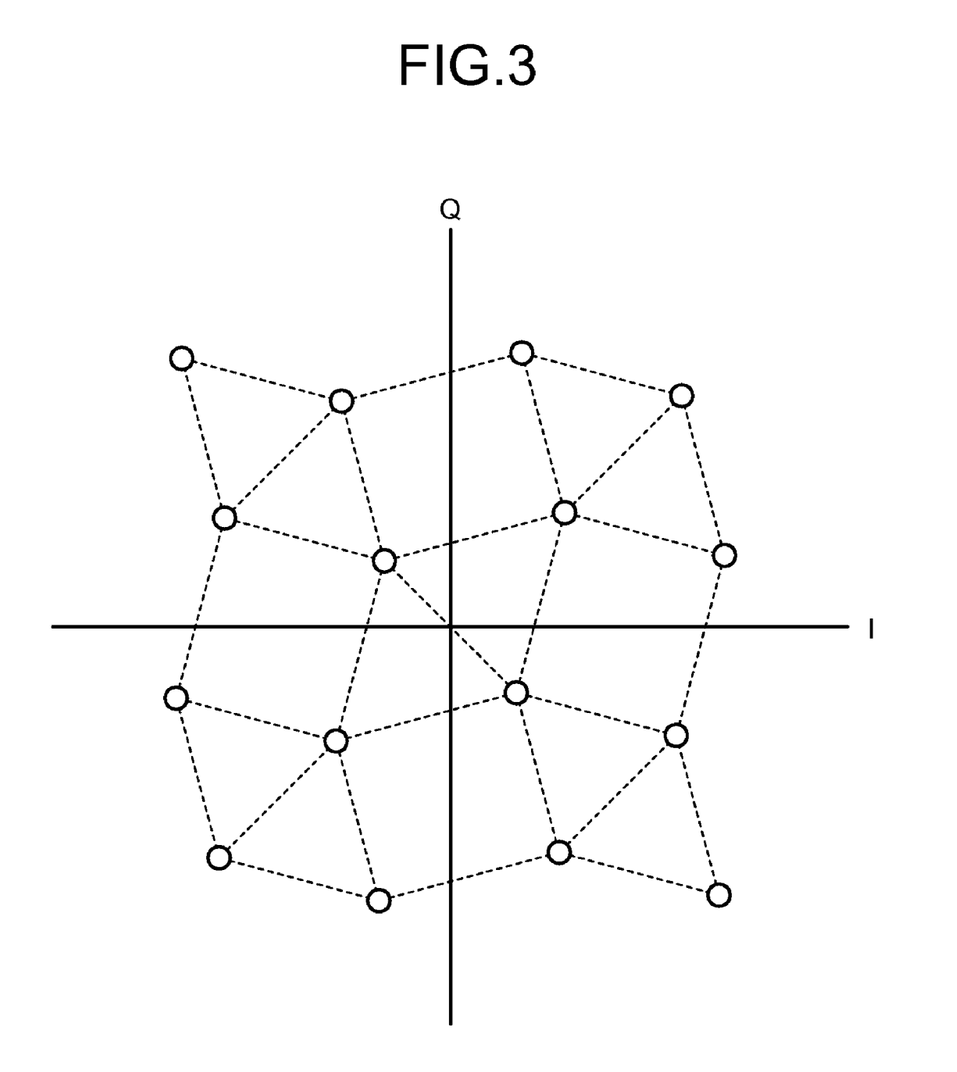
FIG. 3 is a diagram illustrating an example of a modified 16QAM constellation according to the first embodiment.

In the example illustrated in FIG. 3, the signal points closest to the original point in a first quadrant (a quadrant in which both an I component and a Q component are positive), a second quadrant (a quadrant in which the I component is negative and the Q component is positive), and a fourth quadrant (a quadrant in which the I component is positive and the Q component is negative) form an equilateral triangle, and the signal points closest to the original point in the second quadrant, a third quadrant (a quadrant in which both the I component and the Q component are negative), and the fourth quadrant form an equilateral triangle.

In the first and third quadrants, apexes of two equilateral triangles that share an extended line of a straight line that connects the original point with the signal point closest to the original point as one side are used as signal points. Further, in the second and fourth quadrants, an apex of an equilateral triangle that has the signal point closest to the original point as one apex and has a base perpendicular to an extended line of a straight line that connects the original point with the signal point closest to the original point and an apex of another equilateral triangle that shares the base with the equilateral triangle are used as signal points. Each of 16 signal points arranged at these positions corresponds to any one of 16 4-bit sequences from "0000" to "1111," and the 4-bit sequence is transmitted through a symbol of a phase and amplitude corresponding to each signal point. Preferably, the 16 bit sequences are assigned to signal points such that 4 bit sequences in which upper-order two bits are common are assigned to signal points in the same quadrant.

The two equilateral triangles formed by the signal points closest to the original point in the quadrants are congruent, and all of eight equilateral triangles excluding the two equilateral triangles are congruent. Thus, in each quadrant, distances between the signal points positioned at both ends of the equilateral triangle are the same as each other. One side of the two equilateral triangles formed by the signal points closest to the original point is longer than one side of the other eight equilateral triangles. Further, in the constellation, a distance of each signal point from the original point corresponds to amplitude of a symbol. However, an average value of square values of distances of the 16 signal points from the original point in the constellation illustrated in FIG. 3 is equal to an average value of square values of distances of the 16 signal points from the original point in a typical 16QAM constellation. That is, a symbol by the modified 16QAM is equal in transmission power to a symbol by the typical 16QAM.

That is, if average transmission power of a symbol by a modified 16QAM becomes equal to average transmission power by a typical 16QAM, in the modified 16QAM constellation, one side of the two equilateral triangles formed by the signal points closest to the original point is longer than one side of the equilateral triangle formed inside the quadrant.

The modified 16QAM modulation unit 120 assigns the bit sequence output from the encoding unit 110 to any one of the signal points of the constellation by four bits and generates a symbol having a phase and amplitude corresponding to the position of the signal point.

The radio transmission processing unit 130 executes radio transmission processing such as digital-to-analog (D/A) conversion and up conversion on a symbol sequence obtained by modulation performed by the modified 16QAM modulation unit 120 and transmits the symbol sequence through an antenna.

Subsequently, a modified 16QAM constellation used for modulation in the modified 16QAM modulation unit 120 will be described in detail with reference to FIG. 4.

Figure 4:
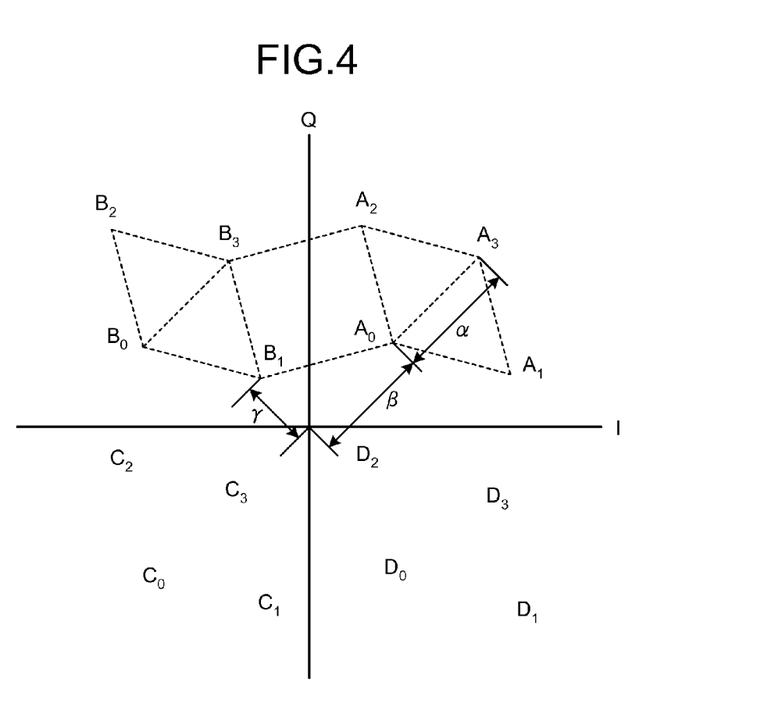
FIG. 4 is a diagram for explaining an arrangement of signal points in a modified 16QAM constellation.

As illustrated in FIG. 4, in each of first to fourth quadrants, four signal points form two equilateral triangles that share one side. Specifically, in the first quadrant, two equilateral triangles are formed by signal points $A_0$, $A_1$, and $A_3$ and signal points $A_0$, $A_2$, and $A_3$. In the second quadrant, two equilateral triangles are formed by signal points $B_0$, $B_1$, and $B_3$ and signal points $B_0$, $B_2$, and $B_3$. In the third quadrant, two equilateral triangles are formed by signal points $C_0$, $C_1$, and $C_3$ and signal points $C_0$, $C_2$, and $C_3$. In the first quadrant, two equilateral triangles are formed by signal points $D_0$, $D_1$, and $D_3$ and signal points $D_0$, $D_2$, and $D_3$. It is assumed that the length of one side in all of the equilateral triangles is defined as $\alpha$.

In each quadrant, the four signal points $A_0$, $B_1$, $C_3$, and $D_2$ closest to the original point in the IQ plane form two equilateral triangles that share a side $B_1D_2$. It is assumed that the distance from the original point to the signal points $A_0$ and $C_3$ closest to the original point in the first quadrant and the third quadrant is defined as $\beta$, and the distance from the original point to the signal points $B_1$ and $D_2$ closest to the original point in the second quadrant and the fourth quadrant is defined as $\gamma$ ($=\beta/\sqrt{3}$). In this case, the length of one side in each of the equilateral triangle $A_0B_1D_2$ and $C_3B_1D_2$ formed by the signal points closest to the original point is $2\gamma$. Further, when average transmission power of a symbol modulated by a modified 16QAM is equal to average transmission power of a symbol modulated by a typical 16QAM as described above, since the two equilateral triangles are larger than the eight equilateral triangles formed in the respective quadrants, a relationship of $\alpha<2\gamma$ is established.

The constellation according to the present embodiment is line-symmetric with respect to a straight line Q=I and a straight light Q=−I that are at an angle of 45° relative to the I axis and the Q axis. The signal points $A_0$ and $A_3$ in the first quadrant and the signal points $C_0$ and $C_3$ in the third quadrant are arranged on the straight line Q=I, and line segments $A_0A_3$ and $C_0C_3$ function as one side shared by the two equilateral triangles in each quadrant. Thus, line segments $A_1A_2$ and $C_1C_2$ (not illustrated) are perpendicular to line segments $A_0A_3$ and $C_0C_3$, respectively.

Meanwhile, the signal points $B_1$ and $B_2$ in the second quadrant and the signal points $D_1$ and $D_2$ in the fourth quadrant are arranged on the straight line Q=−I, and line segments $B_1B_2$ and $D_1D_2$ (not illustrated) are perpendicular to line segments $B_0B_3$ and $D_0D_3$ shared by the two equilateral triangles in each quadrant, respectively. Thus, the line segments $A_1A_2$ and $C_1C_2$ (not illustrated) are perpendicular to the line segments $A_0A_3$ and $C_0C_3$, respectively.

As described above, in the constellation according to the present embodiment, the four signal points in each quadrant form the two equilateral triangles that share one side, and the four signal points closest to the original point in the four quadrants form the two equilateral triangles that share one side. Since the length of one side in the equilateral triangles in each quadrant is $\alpha$, whereas the length of one side in the equilateral triangles formed by the signal points closest to the original point is $2\gamma$, the distance between the signal points in the same quadrant is at least $\alpha$ or more, and the distance between the signal points in the different quadrants is at least $2\gamma$ or more. That is, in the typical 16QAM, the distance between the signal points in the same quadrant is the same as the distance between the signal points in the different quadrants, whereas in the modified 16QAM, the distance between the signal points in the same quadrant is different from the distance between the signal points in the different quadrants. Here, as described above, $\alpha<2\gamma$ is satisfied, the distance between the signal points in the same quadrant relates to a degree of accuracy of demodulation on the lower-order two bits, and the distance between the signal points in the different quadrants relates on a degree of accuracy of demodulation on the upper-order two bits. Thus, in the modified 16QAM according to the present embodiment, a degree of accuracy of demodulation on the upper-order two bits is given preferential treatment over a degree of accuracy of demodulation on the lower-order two bits.

The I component and the Q component of the signal points $A_0$ to $A_3$ and the signal points $B_0$ to $B_3$ in the modified 16QAM constellation illustrated in FIG. 4 may be expressed as follows using $\alpha$, $\beta$, and $\gamma$.

$$A_0 = \left(\frac{\sqrt{2}}{2}\beta, \frac{\sqrt{2}}{2}\beta\right)$$

$$A_1 = \left(\frac{\sqrt{2}+\sqrt{6}}{4}\alpha + \frac{\sqrt{2}}{2}\beta, \frac{\sqrt{2}-\sqrt{6}}{4}\alpha + \frac{\sqrt{2}}{2}\beta\right)$$

$$A_2 = \left(\frac{\sqrt{2}-\sqrt{6}}{4}\alpha + \frac{\sqrt{2}}{2}\beta, \frac{\sqrt{2}+\sqrt{6}}{4}\alpha + \frac{\sqrt{2}}{2}\beta\right)$$

$$A_3 = \left(\frac{\sqrt{2}}{2}(\alpha+\beta), \frac{\sqrt{2}}{2}(\alpha+\beta)\right)$$

$$B_0 = \left(-\frac{\sqrt{6}+\sqrt{2}}{4}\alpha - \frac{\sqrt{2}}{2}\nu, \frac{\sqrt{6}-\sqrt{2}}{4}\alpha + \frac{\sqrt{2}}{2}\nu\right)$$

$$B_1 = \left(-\frac{\sqrt{2}}{2}\nu, \frac{\sqrt{2}}{2}\nu\right)$$

$$B_2 = \left(-\frac{\sqrt{2}}{2}(\sqrt{3}\alpha+\nu), \frac{\sqrt{2}}{2}(\sqrt{3}\alpha+\nu)\right)$$

-continued $$B_3 = \left(-\frac{\sqrt{6}-\sqrt{2}}{4}\alpha - \frac{\sqrt{2}}{2}v, \frac{\sqrt{6}+\sqrt{2}}{4}\alpha + \frac{\sqrt{2}}{2}v\right)$$

Figure 5:
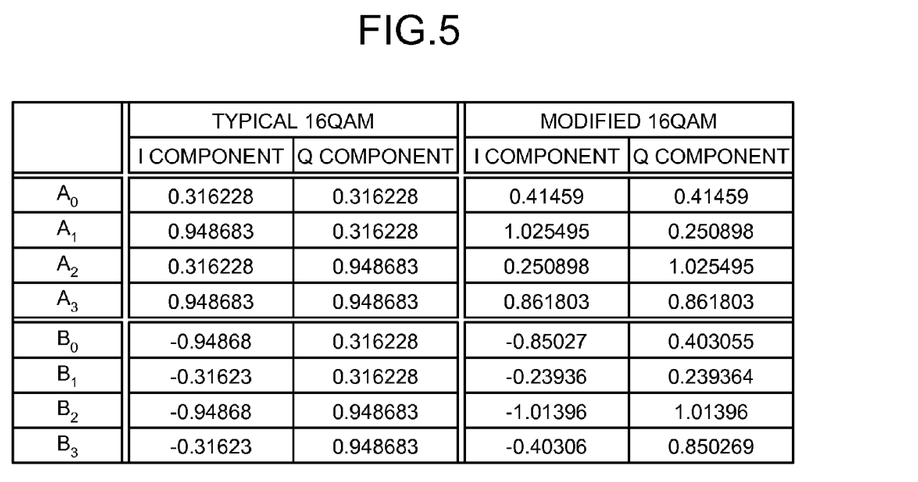
FIG. 5 is a diagram illustrating a concrete example of an I component and a Q component of a signal point in a modified 16QAM constellation.
Figure 6:
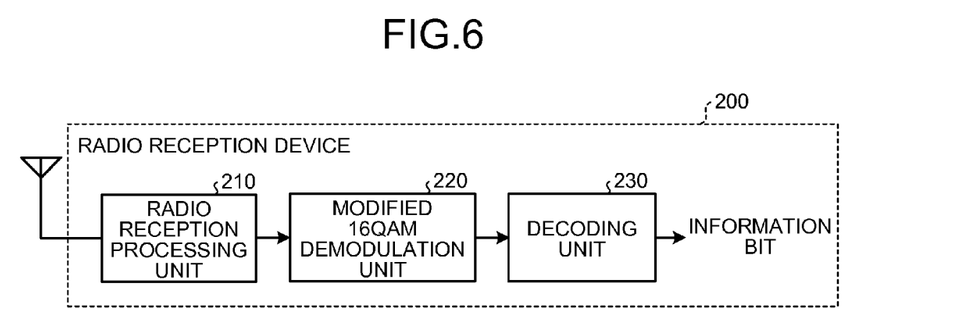
FIG. 6 is a block diagram illustrating a major configuration of a radio reception device according to the first embodiment.

The distance between each signal point and the original point represents the amplitude of a symbol corresponding to the signal point. That is, as a symbol corresponding to the signal point is away from the original point, the amplitude and transmission power increase. In the present embodiment, average transmission power of a symbol by the modified 16QAM is the same as average transmission power of a symbol by the typical 16QAM. FIG. 5 illustrates the I component and the Q component of the signal points $A_0$ to $A_4$ and the signal points $B_0$ to $B_4$ in the case in which the average transmission power is 1, the distance between the signal points in the same quadrant is $\alpha$, and the distance between the signal points in the typical 16QAM is all $2/\sqrt{10}$. Further, FIG. 5 illustrates even the I component and the Q component of the signal points in the typical 16QAM constellation for comparison.

In FIG. 5, for example, on the typical 16QAM, a result of calculating the distance between signal points $A_0$ and $A_1$ is as follows:

$$\sqrt{(0.948683-0.316228)^2 + (0.316228-0.316228)^2} = 0.632455 \left(\approx 2/\sqrt{10}\right)$$

In the typical 16QAM constellation, the distance between the signal points is all equal to the above value. However, in the modified 16QAM, the distance between signal points $A_0$ and $A_1$ is as described below, and it is ascertained that the typical 16QAM and the modified 16QAM are the same in shortest distance between the signal points.

$$\sqrt{(1.025495-0.41459)^2 + (0.250898-0.41459)^2} = 0.632455 \left(\approx 2/\sqrt{10}\right)$$

That is, since the shortest distance between the signal points in the same quadrant in the modified 16QAM constellation is equal to the shortest distance between the signal points in the typical 16QAM constellation, it can be seen that the typical 16QAM and the modified 16QAM are the same in degree of accuracy of demodulation on the lower-order two bits of the four bits mapped to a symbol corresponding to any one signal point.

Further, as a result of calculating a sum of squares of the I component and the Q component, respectively, on the eight signal points of the typical 16QAM and on the eight signal points of the modified 16QAM, approximately 8 is obtained on both the typical 16QAM and the modified 16QAM. A sum of squares of the I component and the Q component of the signal point corresponds to the transmission power of the symbol. Since a sum of squares on the eight signal points is 8, it is ascertained that the average transmission power is 1 on both the typical 16QAM and the modified 16QAM.

In the modified 16QAM constellation, the distance between the signal points in the different quadrants is $2\gamma$ that is larger than the distance $\alpha$ between the signal points in the same quadrant. Thus, according to the modified 16QAM, a degree of accuracy of demodulation on the lower-order two bits and the average transmission power are the same as in the typical 16QAM, and a degree of accuracy of demodulation on the upper-order two bits is improved. That is, according to the modified 16QAM, a degree of accuracy of demodulation on a symbol to be transmitted can be improved while suppressing an increase in transmission power.

Specifically, a result of calculating, for example, the distance between the signal points $A_0$ and $B_1$ of the modified 16QAM is as follows.

$$\sqrt{(-0.23936-0.41459)^2 + (0.239364-0.41459)^2} = 0.677019 \left(> 2/\sqrt{10}\right)$$

That is, the distance between the signal points $A_0$ and $B_1$ that are present in the different quadrants is about 7% as large as the distance between the signal points in the typical 16QAM, and the modified 16QAM is higher in degree of accuracy of demodulation on the upper-order two bits than the typical 16QAM.

Figure 7:
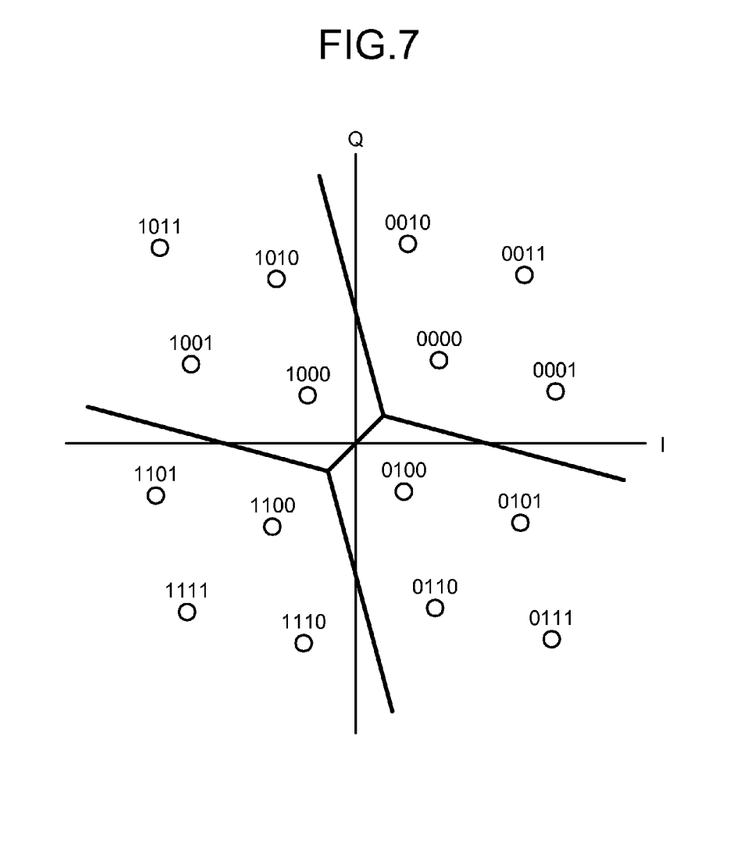
FIG. 7 is a diagram illustrating an example of a determination axis of an upper-order bit used at the time of demodulation according to the first embodiment.

Next, demodulation of a symbol according to the present embodiment will be described. FIG. 7 is a block diagram illustrating a major configuration of a radio reception device 200 according to the present embodiment. The radio reception device 200 illustrated in the same drawing includes a radio reception processing unit 210, a modified 16QAM demodulation unit 220, and a decoding unit 230.

The radio reception processing unit 210 receives the symbol sequence through an antenna and executes radio reception processing such as down conversion and analog-to-digital (A/D) conversion on the received symbol sequence.

The modified 16QAM demodulation unit 220 demodulates the symbol received by the radio reception processing unit 210. Specifically, the modified 16QAM demodulation unit 220 demodulates the upper-order two bits mapped to the symbol using determination axes illustrated by a heavy line in FIG. 7 and demodulates the lower-order two bits mapped to the symbol using determination axes illustrated by a heavy line in FIG. 8. That is, the modified 16QAM demodulation unit 220 acquires the four-bit sequence from on symbol and outputs the four-bit sequence to the decoding unit 230.

The determination axes of the upper-order two bits illustrated in FIG. 7 includes a group of straight lines obtained by connecting middle points of the two signal points that are present in different quadrants and closest to each other. The four areas divided and obtained by the determination axes are areas in which the upper-order two bits are "00", "01", "10", and "11", respectively. Since the distance between the signal points in the different quadrants is larger than the distance between the signal point in the same quadrant as described above, even if the phase and amplitude of the symbol change due to influence of, for example, fading, there is little possibility that the position of the signal point corresponding to the symbol will move beyond the determination axes illustrated in FIG. 7. Thus, the upper-order two bits of the symbol modulated by the modified 16QAM can be demodulated at a higher degree of accuracy than the lower-order two bits.

Figure 8:
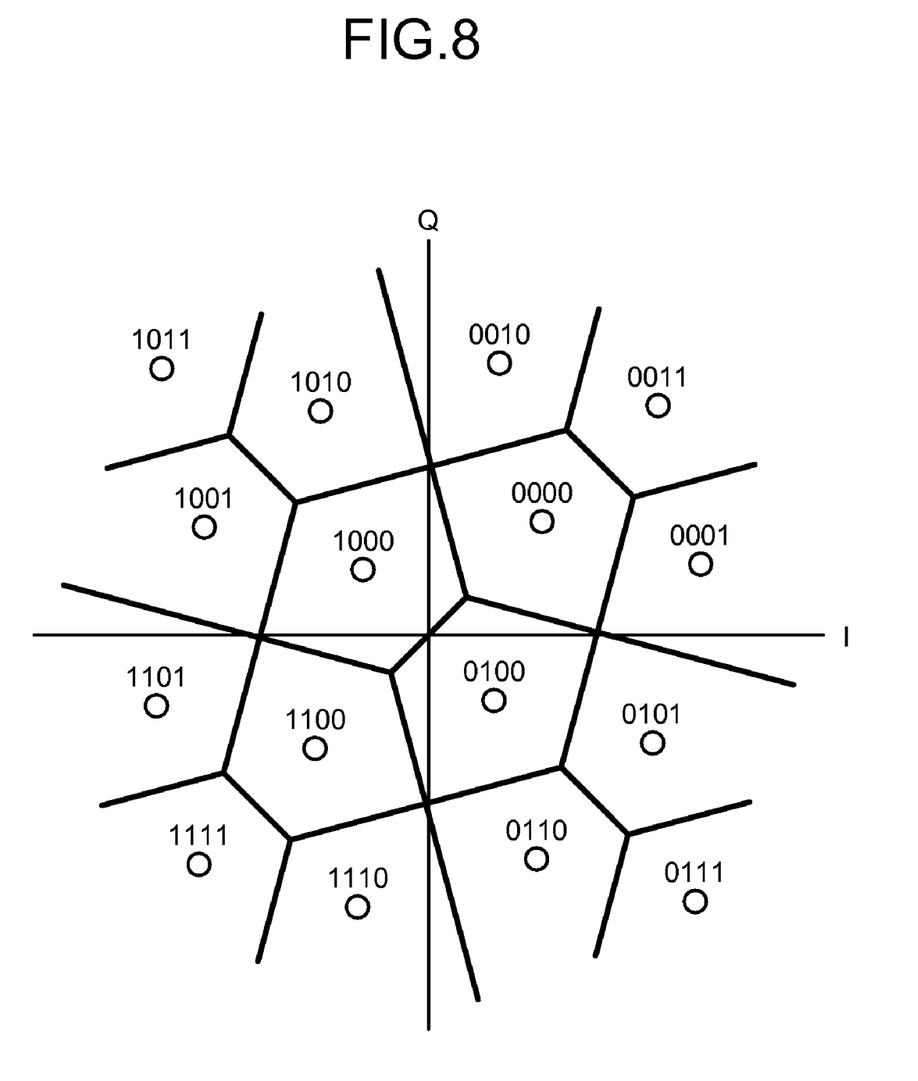
FIG. 8 is a diagram illustrating an example of a determination axis of a lower-order bit used at the time of demodulation according to the first embodiment.

The determination axes of the lower-order two bits illustrated in FIG. 8 include a group of straight lines obtained by connecting middle points of the two signal points that are present the same quadrant and closest to each other in addition of the determination axes of the upper-order two bits. Since the distance between the signal points in the same quadrant is the same as the distance between the signal points in the typical 16QAM as described above, when the symbol is modulated by the modified 16QAM, the degree of accuracy of demodulation on the lower-order two bits does not change compared to when the symbol is modulated by the typical 16QAM.

The decoding unit 230 performs error correction decoding on the bit sequence output from the modified 16QAM demodulation unit 220 and outputs an obtained information bit.

As described above, according to the present embodiment, a transmission bit sequence is modulated by the modified 16QAM having a constellation in which four signal points arranged in each of quadrants in the IQ plane form two equilateral triangles that share one side, and signal points closest to the original point in the quadrants form two equilateral triangles that share one side. Further, in the modified 16QAM constellation, one side of the equilateral triangle formed by the signal points closest the original point is larger than one side of the equilateral triangle formed in the quadrant. Thus, by assigning the same upper-order two bits to the four signal points in the quadrant, the distance between the signal points on the upper-order two bits becomes larger than the distance between the signal points on the lower-order two bits. Thus, the degree of accuracy of demodulation on the upper-order two bits can be improved compared to the lower-order two bits. Further, even though the degree of accuracy of demodulation on the upper-order two bits is improved, the distance between the signal points on the lower-order two bits and the average transmission power of the symbol can become the same as in the typical 16QAM. Therefore, the degree of accuracy of demodulation on the symbol to be transmitted can be improved while suppressing an increase in transmission power.

Figure 9:
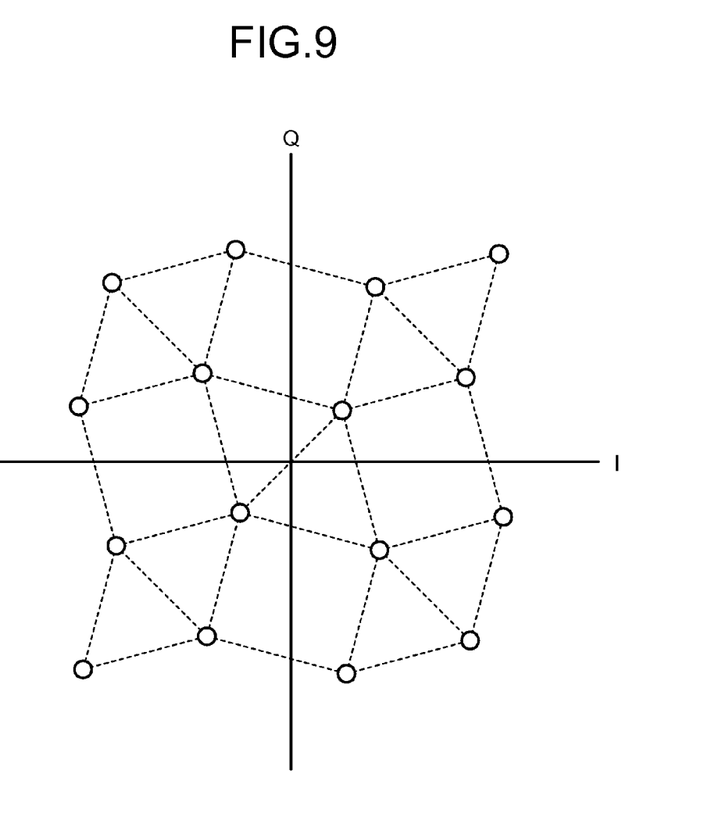
FIG. 9 is a diagram illustrating another example of a modified 16QAM constellation according to the first embodiment.

In the first embodiment, the constellation in which the signal points closest to the original point in the first and third quadrants are farther from the original point than the signal points closest to the original point in the second and fourth quadrants is used, but a mirror image of the constellation may be used. That is, for example, as illustrated in FIG. 9, a constellation in which signal points closest to an original point in first and third quadrants are closer to the original point than signal points closest to the original point in second and fourth quadrants may be used.

[b] Second Embodiment

As a feature of a second embodiment of the present invention, a constellation of a 64QAM in which six bits are transmitted per symbol is modified, and through a modified 64QAM using the modified constellation, a degree of accuracy of demodulation on the upper-order two bits is given preferential treatment over a degree of accuracy of demodulation on the lower-order two bits.

Figure 10:
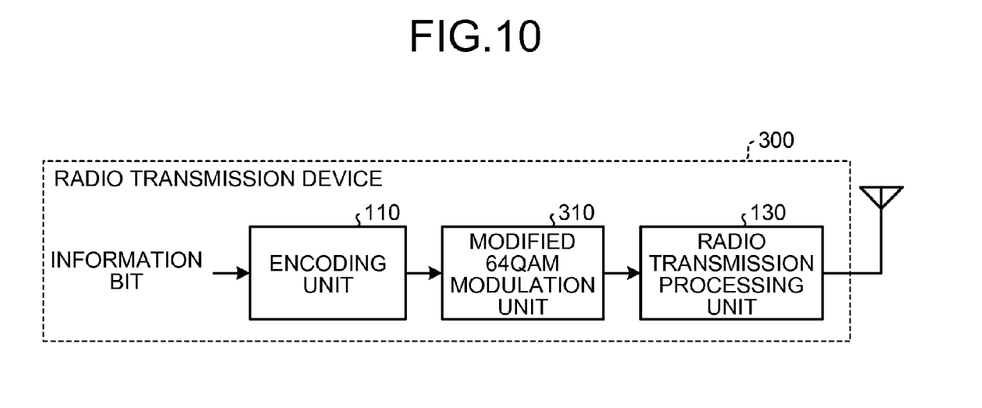
FIG. 10 is a block diagram illustrating a major configuration of a radio transmission device according to a second embodiment.

FIG. 10 is a block diagram illustrating a major configuration of a radio transmission device 300 according to the present embodiment. In the same drawings, the same part as in FIG. 2 is denoted by the same numeral, and a description thereof is omitted. The radio transmission device 300 illustrated in FIG. 10 has a configuration in which the modified 16QAM modulation unit 120 of the radio transmission device 100 illustrated in FIG. 2 is replaced with a modified 64QAM modulation unit 310.

The modified 64QAM modulation unit 310 maps and modulates the bit sequence output from the encoding unit 110 by six bits. At this time, the modified 64QAM modulation unit 310 modulates the bit sequence, for example, through a modified 64QAM having a constellation illustrated in FIG. 11. That is, the modified 64QAM modulation unit 310 modulates the bit sequence through a constellation in which apexes of two equilateral triangles in which a line segment inclined at an angle of 45° relative to an I axis and a Q axis is shared as a base and a middle point of the base is identical to an original point of an IQ plane are used as signal points closest to the original point, and in each quadrant, an overall contour has a rhombic shape having one signal point closest to the original point as an apex, and apexes of 18 neighboring equilateral triangles that share one side, respectively, are used as signal points.

Figure 11:
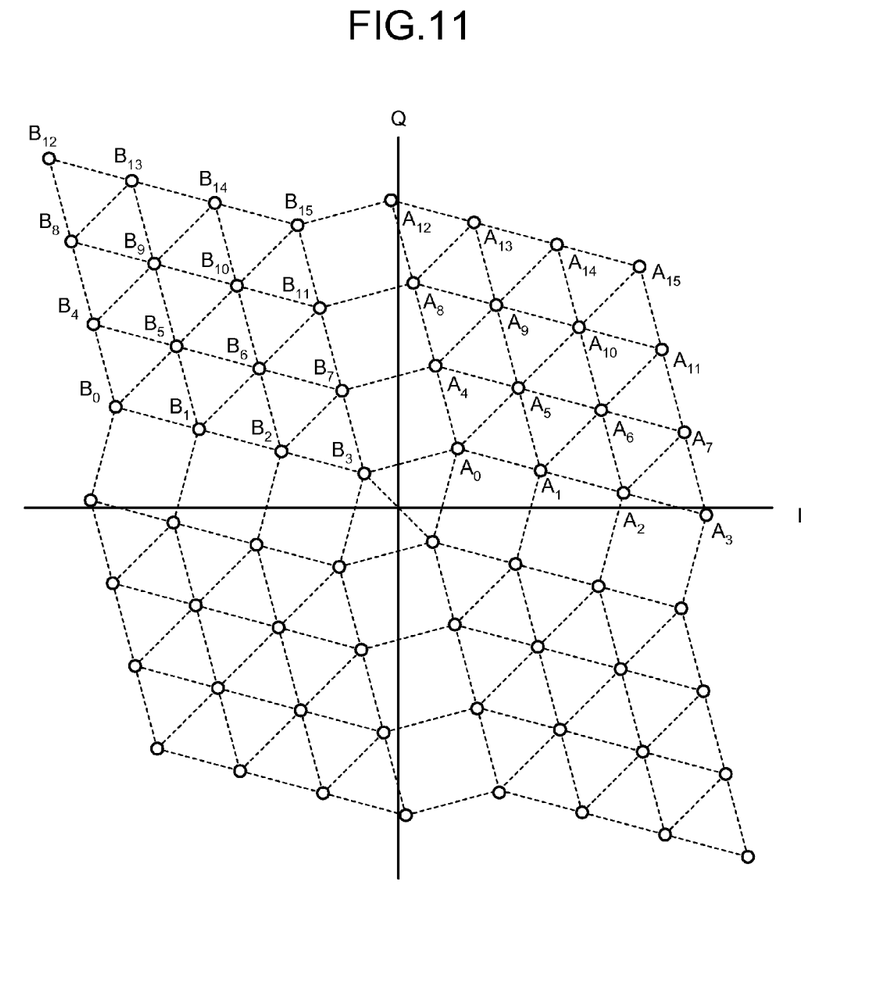
FIG. 11 is a diagram illustrating an example of a modified 64QAM constellation according to the second embodiment.

In FIG. 11, for example, signal points $A_3$ and $A_{12}$ are not included in the first quadrant but in the fourth quadrant and the second quadrant, respectively, but in the present embodiment, for convenience, the signal points $A_3$ and $A_{12}$ are also described as signal points in the first quadrant. That is, it is assumed that 16 signal points of a rhombic shape having a signal point closest to the original point as one apex are included in a quadrant having the signal point closest to the original point. Similarly, a description will be made under assumption that 18 equilateral triangles formed by the 16 signal points are formed in the same quadrant.

In the example, the signal points closest to the original point in the first quadrant, the second quadrant, and the fourth quadrant form an equilateral triangle, and the signal points closest to the original point in the second quadrant, the third quadrant, and the fourth quadrant form an equilateral triangle.

In the first quadrant and the third quadrant, apexes of 18 equilateral triangles that form a rhombic shape in which an extended line of a straight line that connects the original point with the signal points closest to the original point is a shorter diagonal line are used as signal points. In the second quadrant and the fourth quadrant, apexes of 18 equilateral triangles that form a rhombic shape in which an extended line of a straight line that connects the original point with the signal points closest to the original point is a longer diagonal line are used as signal points. Each of 64 signal points arranged at these positions corresponds to any one of 64 6-bit sequences from "000000" to "111111", and the 6-bit sequence is transmitted through a symbol of a phase and amplitude corresponding to each signal point. Preferably, the 64 bit sequences are assigned to signal points such that 16 bit sequences in which upper-order two bits are common are assigned to signal points in the same quadrant.

The two equilateral triangles formed by the signal points closest to the original point in the quadrants are congruent, and all of 72 (=18×4) equilateral triangles excluding the two equilateral triangles are congruent. Thus, in each quadrant, distances between the signal points positioned at both ends of the equilateral triangle are the same as each other. One side of the two equilateral triangles formed by the signal points closest to the original point is longer than one side of the other 72 equilateral triangles. Further, in the constellation, a distance of each signal point from the original point corresponds to amplitude of a symbol. However, an average value of square values of distances of the 64 signal points from the original point in the constellation illustrated in FIG. 11 is equal to an average value of square values of distances of the 64 signal points from the original point in a typical 16QAM constellation. That is, a symbol by the modified 16QAM is equal in transmission power to a symbol by the typical 16QAM.

The modified 64QAM modulation unit 310 assigns the bit sequence output from the encoding unit 110 to any one of the signal points of the constellation by six bits and generates a symbol having a phase and amplitude corresponding to the position of the signal point.

In the constellation according to the present embodiment, the 16 signal points in each quadrant form the 18 equilateral triangles having a contour of a rhombic shape as a whole, and the four signal points closest to the original point in the four quadrants form the two equilateral triangles that share one side. Similarly to the first embodiment, the length of one side of the 72 equilateral triangles in the quadrants is all α, the distance from the original point to the signal points closest to the original point in the first and third quadrants is β, and the distance from the original point to the signal points closest to the original point in the second and fourth quadrants is γ(=β/√3). In this case, similarly to the first embodiment, since the two equilateral triangles formed by the signal points closest to the original point are larger than the 72 equilateral triangles formed in the respective quadrants, a relationship of α<2γ is established.

That is, since the length of one side in the equilateral triangles in each quadrant is α, whereas the length of one side in the equilateral triangles formed by the signal points closest to the original point is 2γ, the distance between the signal points in the same quadrant is at least α or more, and the distance between the signal points in the different quadrants is at least 2γ or more. That is, in the typical 64QAM, the distance between the signal points in the same quadrant is the same as the distance between the signal points in the different quadrants, whereas in the modified 64QAM, the distance between the signal points in the same quadrant is different from the distance between the signal points in the different quadrants. Here, as described above, α<2γ is satisfied, the distance between the signal points in the same quadrant relates to a degree of accuracy of demodulation on the lower-order four bits, and the distance between the signal points in the different quadrants relates on a degree of accuracy of demodulation on the upper-order two bits. Thus, in the modified 64QAM according to the present embodiment, a degree of accuracy of demodulation on the upper-order two bits is given preferential treatment over a degree of accuracy of demodulation on the lower-order four bits.

The I component and the Q component of the signal points $A_0$ to $A_{15}$ and the signal points $B_0$ to $B_{15}$ in the modified 64QAM constellation illustrated in FIG. 11 may be expressed as follows using α, β, and γ.

$$A_0 = \left(\frac{\sqrt{2}}{2}\beta, \frac{\sqrt{2}}{2}\beta\right)$$

$$A_1 = \left(\frac{\sqrt{2}+\sqrt{6}}{4}\alpha + \frac{\sqrt{2}}{2}\beta, \frac{\sqrt{2}-\sqrt{6}}{4}\alpha + \frac{\sqrt{2}}{2}\beta\right)$$

$$A_2 = \left(\frac{\sqrt{2}+\sqrt{6}}{2}\alpha + \frac{\sqrt{2}}{2}\beta, \frac{\sqrt{2}-\sqrt{6}}{2}\alpha + \frac{\sqrt{2}}{2}\beta\right)$$

$$A_3 = \left(\frac{3\sqrt{2}+3\sqrt{6}}{4}\alpha + \frac{\sqrt{2}}{2}\beta, \frac{3\sqrt{2}-3\sqrt{6}}{4}\alpha + \frac{\sqrt{2}}{2}\beta\right)$$

$$A_4 = \left(\frac{\sqrt{2}-\sqrt{6}}{4}\alpha + \frac{\sqrt{2}}{2}\beta, \frac{\sqrt{2}+\sqrt{6}}{4}\alpha + \frac{\sqrt{2}}{2}\beta\right)$$

$$A_5 = \left(\frac{\sqrt{2}}{2}(\alpha+\beta), \frac{\sqrt{2}}{2}(\alpha+\beta)\right)$$

$$A_6 = \left(\frac{3\sqrt{2}+\sqrt{6}}{4}\alpha + \frac{\sqrt{2}}{2}\beta, \frac{3\sqrt{2}-\sqrt{6}}{4}\alpha + \frac{\sqrt{2}}{2}\beta\right)$$

$$A_7 = \left(\frac{2\sqrt{2}+\sqrt{6}}{2}\alpha + \frac{\sqrt{2}}{2}\beta, \frac{2\sqrt{2}-\sqrt{6}}{2}\alpha + \frac{\sqrt{2}}{2}\beta\right)$$

$$A_8 = \left(\frac{\sqrt{2}-\sqrt{6}}{2}\alpha + \frac{\sqrt{2}}{2}\beta, \frac{\sqrt{2}+\sqrt{6}}{2}\alpha + \frac{\sqrt{2}}{2}\beta\right)$$

$$A_9 = \left(\frac{3\sqrt{2}-\sqrt{6}}{4}\alpha + \frac{\sqrt{2}}{2}\beta, \frac{3\sqrt{2}+\sqrt{6}}{4}\alpha + \frac{\sqrt{2}}{2}\beta\right)$$

$$A_{10} = \left(\frac{\sqrt{2}}{2}(2\alpha+\beta), \frac{\sqrt{2}}{2}(2\alpha+\beta)\right)$$

$$A_{11} = \left(\frac{5\sqrt{2}+\sqrt{6}}{4}\alpha + \frac{\sqrt{2}}{2}\beta, \frac{5\sqrt{2}-\sqrt{6}}{4}\alpha + \frac{\sqrt{2}}{2}\beta\right)$$

$$A_{12} = \left(\frac{3\sqrt{2}-3\sqrt{6}}{4}\alpha + \frac{\sqrt{2}}{2}\beta, \frac{3\sqrt{2}+3\sqrt{6}}{4}\alpha + \frac{\sqrt{2}}{2}\beta\right)$$

$$A_{13} = \left(\frac{2\sqrt{2}-\sqrt{6}}{2}\alpha + \frac{\sqrt{2}}{2}\beta, \frac{2\sqrt{2}+\sqrt{6}}{2}\alpha + \frac{\sqrt{2}}{2}\beta\right)$$

$$A_{14} = \left(\frac{5\sqrt{2}-\sqrt{6}}{4}\alpha + \frac{\sqrt{2}}{2}\beta, \frac{5\sqrt{2}+\sqrt{6}}{4}\alpha + \frac{\sqrt{2}}{2}\beta\right)$$

$$A_{15} = \left(\frac{\sqrt{2}}{2}(3\alpha+\beta), \frac{\sqrt{2}}{2}(3\alpha+\beta)\right)$$

$$B_0 = \left(-\frac{3\sqrt{6}+3\sqrt{2}}{4}\alpha - \frac{\sqrt{2}}{2}v, \frac{3\sqrt{6}-3\sqrt{2}}{4}\alpha + \frac{\sqrt{2}}{2}v\right)$$

$$B_1 = \left(-\frac{\sqrt{6}+\sqrt{2}}{2}\alpha - \frac{\sqrt{2}}{2}v, \frac{\sqrt{6}-\sqrt{2}}{2}\alpha + \frac{\sqrt{2}}{2}v\right)$$

$$B_2 = \left(-\frac{\sqrt{6}+\sqrt{2}}{4}\alpha - \frac{\sqrt{2}}{2}v, \frac{\sqrt{6}-\sqrt{2}}{4}\alpha + \frac{\sqrt{2}}{2}v\right)$$

$$B_3 = \left(-\frac{\sqrt{2}}{2}v, \frac{\sqrt{2}}{2}v\right)$$

$$B_4 = \left(-\frac{2\sqrt{6}+\sqrt{2}}{2}\alpha - \frac{\sqrt{2}}{2}v, \frac{2\sqrt{6}-\sqrt{2}}{2}\alpha + \frac{\sqrt{2}}{2}v\right)$$

$$B_5 = \left(-\frac{3\sqrt{6}+\sqrt{2}}{4}\alpha - \frac{\sqrt{2}}{2}v, \frac{3\sqrt{6}-\sqrt{2}}{4}\alpha + \frac{\sqrt{2}}{2}v\right)$$

$$B_6 = \left(-\frac{\sqrt{2}}{2}(\sqrt{3}\alpha+v), \frac{\sqrt{2}}{2}(\sqrt{3}\alpha+v)\right)$$

$$B_7 = \left(-\frac{\sqrt{6}-\sqrt{2}}{4}\alpha - \frac{\sqrt{2}}{2}v, \frac{\sqrt{6}+\sqrt{2}}{4}\alpha + \frac{\sqrt{2}}{2}v\right)$$

$$B_8 = \left(-\frac{5\sqrt{6}+\sqrt{2}}{4}\alpha - \frac{\sqrt{2}}{2}v, \frac{5\sqrt{6}-\sqrt{2}}{4}\alpha + \frac{\sqrt{2}}{2}v\right)$$

$$B_9 = \left(-\frac{\sqrt{2}}{2}(2\sqrt{3}\alpha+v), \frac{\sqrt{2}}{2}(2\sqrt{3}\alpha+v)\right)$$

$$B_{10} = \left(-\frac{3\sqrt{6}-\sqrt{2}}{4}\alpha - \frac{\sqrt{2}}{2}v, \frac{3\sqrt{6}+\sqrt{2}}{4}\alpha + \frac{\sqrt{2}}{2}v\right)$$

$$B_{11} = \left(-\frac{\sqrt{6}-\sqrt{2}}{2}\alpha - \frac{\sqrt{2}}{2}v, \frac{\sqrt{6}+\sqrt{2}}{2}\alpha + \frac{\sqrt{2}}{2}v\right)$$

$$B_{12} = \left(-\frac{\sqrt{2}}{2}(3\sqrt{3}\alpha+v), \frac{\sqrt{2}}{2}(3\sqrt{3}\alpha+v)\right)$$

$$B_{13} = \left(-\frac{5\sqrt{6}-\sqrt{2}}{4}\alpha - \frac{\sqrt{2}}{2}v, \frac{5\sqrt{6}+\sqrt{2}}{4}\alpha + \frac{\sqrt{2}}{2}v\right)$$

$$B_{14} = \left(-\frac{2\sqrt{6}-\sqrt{2}}{2}\alpha - \frac{\sqrt{2}}{2}v, \frac{2\sqrt{6}+\sqrt{2}}{2}\alpha + \frac{\sqrt{2}}{2}v\right)$$

$$B_{15} = \left(-\frac{3\sqrt{6}-3\sqrt{2}}{4}\alpha - \frac{\sqrt{2}}{2}v, \frac{3\sqrt{6}+3\sqrt{2}}{4}\alpha + \frac{\sqrt{2}}{2}v\right)$$

Figure 12:
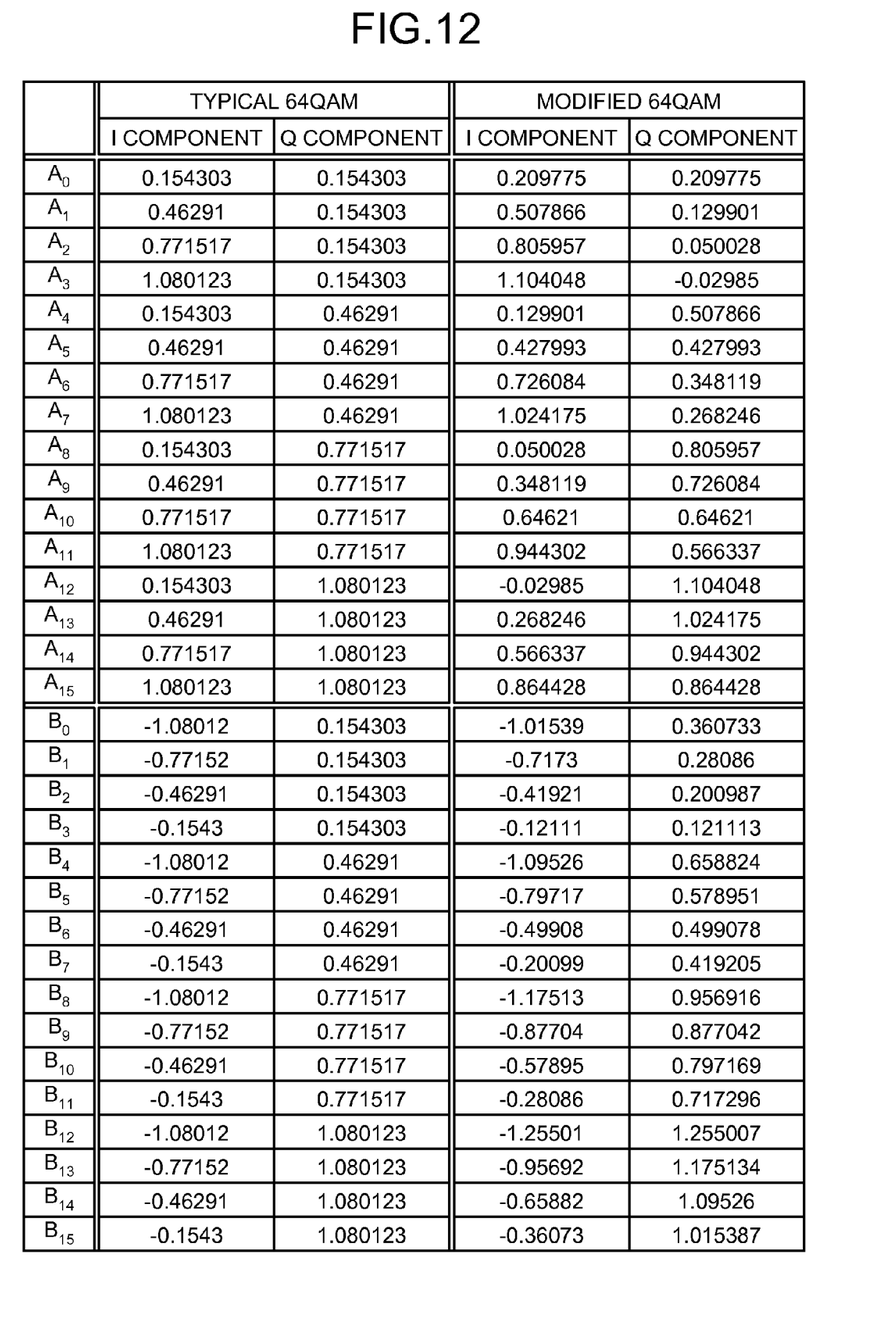
FIG. 12 is a diagram illustrating a concrete example of an I component and a Q component of a signal point in a modified 64QAM constellation.

The distance between each signal point and the original point represents the amplitude of a symbol corresponding to the signal point. That is, as a symbol corresponding to the signal point is away from the original point, the amplitude and transmission power increase. In the present embodiment, average transmission power of a symbol by the modified 64QAM is the same as average transmission power of a symbol by the typical 64QAM. FIG. 12 illustrates the I component and the Q component of the signal points $A_0$ to $A_{15}$ and the signal points $B_0$ to $B_{15}$ in the case in which the average transmission power is 1, the distance between the signal points in the same quadrant is α, and the distance between the signal points in the typical 64QAM is all $2/\sqrt{42}$. Further, FIG. 12 illustrates even the I component and the Q component of the signal points in the typical 64QAM constellation for comparison.

In FIG. 12, for example, on the typical 64QAM, a result of calculating the distance between signal points $A_0$ and $A_1$ is as follows:

$$\sqrt{(0.46291-0.154303)^2+(0.154303-0.154303)^2}=0.308607(\approx 2/\sqrt{42})$$

In the typical 64QAM constellation, the distance between the signal points is all equal to the above value. However, in the modified 64QAM, the distance between signal points $A_0$ and $A_1$ is as described below, and it is ascertained that the typical 64QAM and the modified 64QAM are the same in shortest distance between the signal points.

$$\sqrt{(0.507866-0.209775)^2+(0.129901-0.209775)^2}=$$
$$0.308607(\approx 2/\sqrt{42})$$

That is, since the shortest distance between the signal points in the same quadrant in the modified 64QAM constellation is equal to the shortest distance between the signal points in the typical 64QAM constellation, it can be seen that the typical 64QAM and the modified 64QAM are the same in degree of accuracy of demodulation on the lower-order four bits of the six bits mapped to a symbol corresponding to any one signal point.

Further, as a result of calculating a sum of squares of the I component and the Q component, respectively, on the 32 signal points of the typical 64QAM and on the 32 signal points of the modified 64QAM, approximately 32 is obtained on both the typical 64QAM and the modified 64QAM. A sum of squares of the I component and the Q component of the signal point corresponds to the transmission power of the symbol. Since a sum of squares on the 32 signal points is 32, it is ascertained that the average transmission power is 1 on both the typical 64QAM and the modified 64QAM.

In the modified 64QAM constellation, the distance between the signal points in the different quadrants is 2γ that is larger than the distance α between the signal points in the same quadrant. Thus, according to the modified 64QAM, a degree of accuracy of demodulation on the lower-order four bits and the average transmission power are the same as in the typical 64QAM, and a degree of accuracy of demodulation on the upper-order two bits is improved. That is, according to the modified 64QAM, a degree of accuracy of demodulation on a symbol to be transmitted can be improved while suppressing an increase in transmission power.

Specifically, a result of calculating, for example, the distance between the signal points $A_0$ and $B_3$ of the modified 64QAM is as follows.

$$\sqrt{(-0.12111-0.209775)^2+(0.121113-0.209775)^2}=$$
$$0.342558(>2/\sqrt{42})$$

That is, the distance between the signal points $A_0$ and $B_3$ that are present in the different quadrants is about 11% as large as the distance between the signal points in the typical 64QAM, and the modified 64QAM is higher in degree of accuracy of demodulation on the upper-order two bits than the typical 64QAM.

As described above, according to the present embodiment, a transmission bit sequence is modulated by the modified 64QAM having a constellation in which 16 signal points arranged in each of quadrants in the IQ plane form 18 equilateral triangles having a contour of a rhombic shape as a whole, and signal points closest to the original point in the quadrants form two equilateral triangles that share one side. Further, in the modified 64QAM constellation, one side of the equilateral triangle formed by the signal points closest the original point is larger than one side of the equilateral triangle formed in the quadrant. Thus, by assigning the same upper-order two bits to the 16 signal points in the quadrant, the distance between the signal points on the upper-order two bits becomes larger than the distance between the signal points on the lower-order four bits. Thus, the degree of accuracy of demodulation on the upper-order two bits can be improved compared to the lower-order four bits. Further, even though the degree of accuracy of demodulation on the upper-order two bits is improved, the distance between the signal points on the lower-order four bits and the average transmission power of the symbol can become the same as in the typical 64QAM. Therefore, the degree of accuracy of demodulation on the symbol to be transmitted can be improved while suppressing an increase in transmission power.

In the above described embodiments, since the modified 16QAM constellation or the modified 64QAM constellation is used in the hierarchical modulation scheme, the same upper-order two bits are assigned to a plurality of (4 or 16) signal points in each quadrant of the constellation. However, the present invention may apply to a scheme other than the hierarchical modulation scheme. Further, since the distance between the signal points in the same quadrant is larger than the distance between the signal points in the different quadrants, without increasing the average transmission power, the degree of accuracy of the entire demodulation can be improved by an increase in distance between the signal points in the different quadrants compared to the typical constellation.

Further, the above-described embodiments have been described in connection with the modified 16QAM and the 64QAM, but modulation to which a constellation of a modified $2^n$ QAM (n is an integer equal to or more than 2) such as a modified 256QAM is applied can be performed in the same manner. In the modified $2^n$ QAM constellation, $2^{(n-2)}$ signal points are arranged in each quadrant, and the number T of equilateral triangles formed in each quadrant is as follows.

$$T=2\cdot(2^{\frac{n}{2}-1}-1)\cdot(2^{\frac{n}{2}-1}-1)$$

Thus, for example, in the 256 ($=2^8$) QAM constellation, 64 signal points are arranged in each quadrant, and 98 equilateral triangles are formed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio transmission device, comprising:
   a modulation unit that maps a transmission bit sequence to a symbol corresponding to any one signal point by using a constellation in which a plurality of congruent equilateral triangles having a signal point as an apex are formed in each of four quadrants of an IQ plane representing an in-phase component and a quadrature component of a signal, two arbitrary neighboring equilateral triangles share one side, and signal points closest to an original point in the four quadrants form two neighboring equilateral triangles that share one side; and
   a transmission unit that transmits the symbol obtained by mapping performed by the modulation unit.

2. The radio transmission device according to claim 1, wherein the modulation unit maps the transmission bit sequence using a constellation in which one side of the two equilateral triangles formed by the signal points closest to the original point is longer than one side of the plurality of equilateral triangles formed in each of the four quadrants.

3. The radio transmission device according to claim 1, wherein the modulation unit maps the transmission bit sequence by four bits using a modified 16QAM constellation in which two neighboring equilateral triangles that use four signal points as apexes and share one side are formed in each of the four quadrants.

4. The radio transmission device according to claim 1, wherein the modulation unit maps the transmission bit sequence by six bits using a modified 64QAM constellation in which 16 neighboring equilateral triangles that use 16 signal points as apexes and have an entire contour of a rhombic shape are formed in each of the four quadrants.

5. The radio transmission device according to claim 1, wherein the modulation unit maps the transmission bit sequence using a constellation that is line-symmetric on a straight line Q=I and a straight line Q=−I.

6. The radio transmission device according to claim 1, wherein the modulation unit maps the transmission bit sequence using a constellation in which a middle point of one side shared by the two equilateral triangles formed by the signal points closest to the original point is identical to the original point of the IQ plane.

7. The radio transmission device according to claim 1, wherein the modulation unit maps the transmission bit sequence using a constellation in which in two quadrants of the four quadrants, an extended line of a straight line that connects the original point with the signal point closest to the original point becomes one side of a plurality of equilateral triangles, and in the other two quadrants, an extended line of a straight line that connects the original point with the signal point closest to the original point does not become one side of a plurality of equilateral triangles.

8. The radio transmission device according to claim 1, wherein the modulation unit maps the transmission bit sequence using a constellation in which bit sequences that correspond to a plurality of signal points, respectively, in each quadrant have the same upper-order two bits.

9. A modulation method performed by a radio transmission device, comprising:
   mapping a transmission bit sequence to a symbol corresponding to any one signal point by using a constellation in which a plurality of congruent equilateral triangles having a signal point as an apex are formed in each of four quadrants of an IQ plane representing an in-phase component and a quadrature component of a signal, two arbitrary neighboring equilateral triangles share one side, and signal points closest to an original point in the four quadrants form two neighboring equilateral triangles that share one side.

* * * * *